T. J. PETERS.
CANE STRIPPER.
APPLICATION FILED MAR. 9, 1908.
928,149.
Patented July 13, 1909.
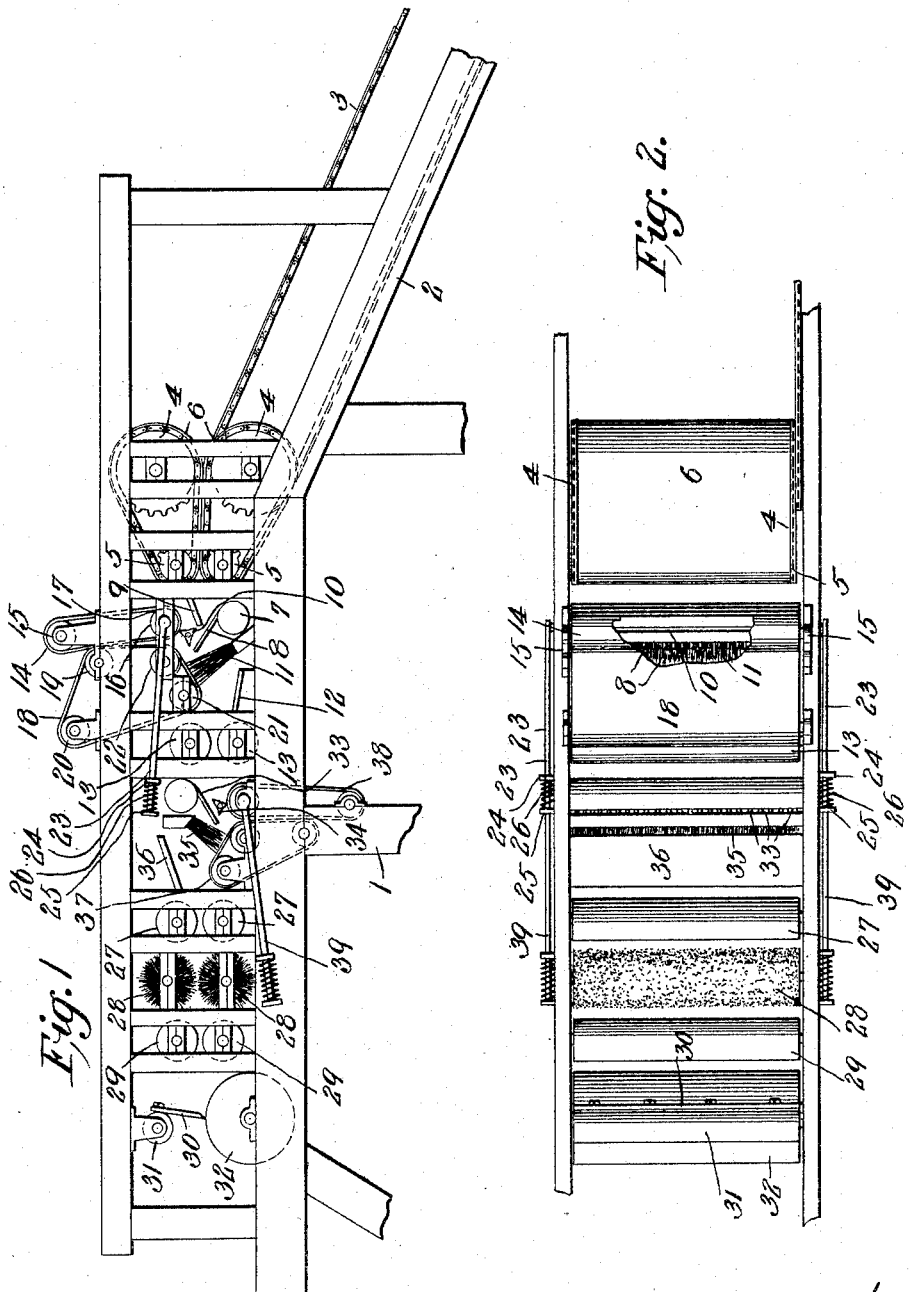
Witnesses.
Jos. F. Collins.
L. R. Nevitt.
Inventor:
Thomas J. Peters
By Knight Bros
Attorneys.

UNITED STATES PATENT OFFICE.

THOMAS J. PETERS, OF PERRINE, FLORIDA.

CANE-STRIPPER.

No. 928,149.  Specification of Letters Patent.  Patented July 13, 1909.

Application filed March 9, 1908. Serial No. 419,969.

*To all whom it may concern:*

Be it known that I, THOMAS J. PETERS, a citizen of the United States, residing at Perrine, in the county of Dade and State of Florida, have invented certain new and useful Improvements in Cane-Strippers, of which the following is a description.

In the drawings, Figure 1 is a side elevation of a harvester embodying my invention, the frame and truck being broken away; Fig. 2 is a top plan view of the same.

This stripper is of the general type of machine shown in my application, Serial No. 349,523, filed December 26, 1906.

The object of my present invention is to produce a stripper that will do more effective work than the one embodied in my first machine; and with this and minor objects in view, my invention consists of the parts and combination of parts as will be hereinafter more fully pointed out.

1 represents the truck frame of the machine, which is broken away. The machine is mounted on wheels, not shown, to facilitate transporting it from place to place.

2 is a chute extending from the top of the machine to a point near the ground, up which the stalks of sugar cane or other material operated upon are drawn by means of the conveyer belt 3 to the cleaning mechanism, said belt being run over suitable pulleys by which it is operated. The belt 3 conveys the material to the feeding rollers 4 which with the rollers 5 support and operate the feed belts or aprons 6.

7 is a bar secured transversely of the machine, upon which are secured a series of fingers 8, said fingers comprising a piece of wire, one end of which is coiled around and secured to said bar.

9 is a deflector or guide positioned at the delivery end of the feeding belts and given a slight downward inclination toward the spring fingers 8, said fingers 8 being arranged obliquely on the bar 7, whereby a contracted throat for the material operated upon is formed between the fingers 8 and guide 9.

10 is a rotatable cutter extending transversely of and suitably journaled in the frame of the machine above both the guide 9 and fingers 8, but intermediate of the end of said guide and the ends of the fingers 8. Said cutter is provided with three blades extending the full width of the machine and adapted to be operated by the material passed through the machine.

11 is a stiff brush of metal or suitable fiber secured to and extending across the machine in an inclined position, the inclination being away from the fingers 8.

12 is a guide adapted to guide material to a second cleaning mechanism over the supplemental feeding rollers 13.

14 is an endless belt mounted on rollers 15 and 16, the roller 16 being provided with a sliding bearing 17 to be hereinafter referred to. The belt 14 is mounted in a vertical position.

18 is an endless belt mounted on rollers 19, 20, 21 and 22; the rollers 19 and 22 being in vertical alinement with each other in order that the belt lying between them may be straight and presented against the belt 14. The rollers 19 and 20 are in different horizontal planes in order that the belt between them may act as a delivery from which the material may be readily taken. The rollers 21 and 22 are in different horizontal positions, whereby that portion of the belt between them is on the same inclination as the ends of the fibers of the brush 11.

23 are rods loosely secured to the ends of the journal of roller 16, said rods being supported at the outer ends by means of eyes 24.

25 are enlarged heads secured to the outer ends of the rods 23.

26 is a tension spring positioned around the rod 23 and between the head 25 and eye 24. The office of the tension spring is to hold the roller 16 snugly against the roller 22, whereby the belts 18 and 14 are held in close frictional contact at the bottom over the knife or cutter 10.

27 are feed rollers.

28 are stiff wire brushes, 29 are feed rollers and 30 is a rotary knife mounted on the shaft 31.

32 is a rotary "block" for the knife 30.

The cleaning mechanism comprises the fingers 33, rotary cutter 34, brush 35, guide 36, belts 37 and 38 and tension device 39, all of which are of the same construction as similar parts hereinbefore described, the parts being in slightly different position but in the same relative position with respect to each other. In short, these parts are a duplication of the first cleaner.

In the operation of the machine, the sugar cane stalks are fed through the feed rollers 4 by means of the endless belt or conveyer 3. The belts 6 convey the stalks to the fingers 8, said stalks being guided to said fingers and to a certain extent held thereon by means of the guide 9. The brush 11 turns the tops of the stalks up into the cleaner belts 14 and 18, the bottom rollers of which are held in close contact by means of the tension rod 23, and the leaves and top of the stalk are taken up between the cleaner belts 14 and 18 until the stalk or hard part of the cane is drawn against the rotary cutter or knife 10, which cuts the stalk off, whereupon the tops and leaves of the cane are free to be passed out of the machine by the belts 14 and 18. The stalk or hard part of the cane is then fed through the spring fingers 8 on to the brush 11, from which it falls on the guide 12 and is then passed through the feed rollers 13 against the spring fingers 33. In this second set of feeding devices, the leaves are torn from the bottom side of the stalks of cane after which the cane is received by the feed rollers 27 and presented to the revolving brushes 28, which revolve in a direction opposite to the travel of the cane stalks, thereby brushing off all parts of the leaves that may be left by the preceding cleaning device. The stalks pass from the rollers 28 to the feed rollers 29, which feed them to the rotary chopping knife 30, which co-acting with the rotary "block" chops the stalks into suitable lengths.

While I have not shown the details of gearing between the several rollers and moving parts of my machine, it will be understood that any suitable chain of gear and driving belts may be employed.

Having thus described my invention, what I claim as new therein and desire to secure by Letters Patent is:—

1. In a cane stripper, the combination with the endless feeding belts traveling parallel for a portion of their length; of a pair of stripping belts also traveling parallelly for a portion of their length, in planes intersecting the planes of the parallel portions of said feeding belts from a point adjacent to the end of the parallel portions of the feeding belts; and a revoluble knife positioned at the apex of the angle between the parallel portions of said feeding and stripping belts.

2. In a cane stripper, the combination with endless belts running parallel for a part of their length, and a tension member holding said belts in close position, of a revoluble knife provided with radially-extending transverse blades positioned close to the point of contact of said belts, spring finger guides constructed to direct material to said knife, and a brush positioned beyond the said knife and guide fingers.

3. In a cane stripper, the combination with endless belts running parallel for a part of their length, and a tension member holding said belts in close position, of a revoluble knife positioned close to the point of contact of said belts, spring finger guides constructed to direct material to said knife, and a brush positioned beyond the said knife and guide fingers, feed rollers positioned beyond said brush, and revoluble stripping brushes.

4. In a cane stripper, the combination with endless belts running parallel for a part of their length, and a tension member holding said belts in close position, of a revoluble knife positioned close to the point of contact of said belts, spring finger guides constructed to direct material to said knife, a brush positioned beyond the said knife and guide fingers, feed rollers positioned beyond said brush, revoluble stripping brushes, delivery rollers beyond said stripping brushes, and a revoluble knife and chopping block in close relation to said delivery rollers.

The foregoing specification signed at Perrine, Fla., this 26th day of September, 1907.

THOMAS J. PETERS.

In presence of two witnesses—
F. A. SAYERS,
P. L. JENKINS.